United States Patent
Yuta et al.

(10) Patent No.: US 7,980,982 B2
(45) Date of Patent: Jul. 19, 2011

(54) TELESCOPIC ACTUATOR

(75) Inventors: Atsushi Yuta, Wako (JP); Hajime Kajiwara, Wako (JP); Takehiko Hakui, Wako (JP); Masanori Watanabe, Wako (JP); Kotaro Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 12/411,790

(22) Filed: Mar. 26, 2009

(65) Prior Publication Data

US 2009/0241706 A1 Oct. 1, 2009

(30) Foreign Application Priority Data

Mar. 27, 2008 (JP) ................. 2008-082896

(51) Int. Cl.
*F16H 48/06* (2006.01)
(52) U.S. Cl. ...................................... 475/149
(58) Field of Classification Search ............ 280/5.52, 280/5.521, 5.522
See application file for complete search history.

(56) References Cited

U.S. PATENT DOCUMENTS

| | | | |
|---|---|---|---|
| 4,603,594 A | 8/1986 | Grimm | |
| 4,987,788 A | 1/1991 | Bausch | |
| 5,087,229 A * | 2/1992 | Hewko et al. | 475/149 |
| 7,766,345 B2 * | 8/2010 | Hakui et al. | 280/5.521 |
| 7,871,084 B2 * | 1/2011 | Hakui et al. | 280/5.521 |
| 2005/0183525 A1 | 8/2005 | Blendea et al. | |

FOREIGN PATENT DOCUMENTS

| | | |
|---|---|---|
| FR | 2 904 282 | 2/2008 |
| GB | 627 004 | 7/1949 |
| JP | 05-178042 | 7/1993 |
| JP | 6-47388 | 6/1994 |
| JP | 08-337106 | 12/1996 |
| JP | 2006-207644 | 8/2006 |
| JP | 2007-253863 | 10/2007 |
| JP | 2008-030499 | 2/2008 |
| WO | 98/30816 | 7/1998 |
| WO | 9959235 | 11/1999 |
| WO | 2008102673 | 8/2008 |

* cited by examiner

*Primary Examiner* — Edwin A. Young
(74) *Attorney, Agent, or Firm* — Rankin, Hill & Clark LLP (57) ABSTRACT

A ring gear of a planetary reduction gear is screwed into an inner peripheral surface of a first housing through an opening thereof, while the thrust-receiving flange of a screw feed mechanism is held by the locknut screwed into an inner peripheral surface of a second housing through an opening thereof. In addition, the locknut and the ring gear face each other in an axial direction with a slight gap provided therebetween when the openings, respectively, of the first and second housings are connected to each other in the axial direction. Accordingly, even if the threaded connection of any one component of the locknut and the ring gear is loosened, the one component is prevented from moving by the other component.

6 Claims, 6 Drawing Sheets

FIG.6

TELESCOPIC ACTUATOR

BACKGROUND OF THE INVENTION

1. Field of the Invention

The present invention relates to a telescopic actuator that converts a rotation of a rotating shaft of a motor into expansion and contraction movements of an output rod via a planetary reduction gear housed in a first housing and a screw feed mechanism housed in a second housing.

2. Description of the Related Art

An arrangement in which expansion and contraction of an upper link and a lower link of a vehicular suspension system are controlled by a telescopic actuator to thus enhance steering stability performance by suppressing changes in camber angle or contact patch accompanying bumping and rebounding of a wheel, the telescopic actuator being formed from a screw feed mechanism that includes a male thread member and a female thread member that are rotated relative to each other by a motor, is known from Japanese Patent Publication No. 6-47388.

In such a telescopic actuator, the output rod is expanded and contracted by transmitting the rotation of the motor to the screw feed mechanism while reducing the rotation by the planetary reduction gear. In this event, in order to support, with the housing, a thrust force transmitted reversely from the output rod to the male thread member of the screw feed mechanism, it is necessary to hold a thrust-receiving flange, which is provided on the male thread member, in the housing via a thrust bearing. In this regard, it is conceivable that the thrust-receiving flange is held with a locknut that is screwed into an inner peripheral surface of the housing through an opening thereof. However, this approach requires dedicated locking means, such as a circlip, to be provided in order to prevent the locknut from being loosened and then dropping off the housing.

BRIEF SUMMARY OF THE INVENTION

The present invention has been made in view of the above-described circumstances, and an object of the present invention is to prevent a locknut holding a thrust-receiving flange of a telescopic actuator from dropping off without using any dedicated locking means.

According to a first feature of the present invention, there is provided a telescopic actuator that converts a rotation of a rotating shaft of a motor into expansion and contraction movements of an output rod via a planetary reduction gear housed in a first housing and a screw feed mechanism housed in a second housing, the second housing supporting a thrust force acting on a thrust-receiving flange provided to a male thread member of the screw feed mechanism. The first and second housings respectively include openings connected to each other in an axial direction and a ring gear of the reduction gear is screwed into an inner peripheral surface of the first housing through the opening thereof. The thrust-receiving flange is held by a locknut screwed into an inner peripheral surface of the second housing through the opening thereof. The locknut and the ring gear face each other in the axial direction with a slight gap provided therebetween in a state where the first and second housings are connected to each other.

In accordance with the present invention, the ring gear of the planetary reduction gear is screwed into the inner peripheral surface of the first housing through the opening thereof, while the thrust-receiving flange of the screw feed mechanism is held by the locknut screwed into the inner peripheral surface of the second housing through the opening thereof. In addition, the locknut and the ring gear face each other in the axial direction with the slight gap provided therebetween when the openings, respectively, of the first and second housings are connected to each other in the axial direction. Accordingly, even if the threaded connection of any one component of the locknut and the ring gear is loosened, the one component is prevented from moving by the other component. As a result, it is possible to securely prevent the locknut and the ring gear from dropping off the first and second housings without using any dedicated locking means.

An embodiment of the present invention is explained below by reference to the attached drawings.

DESCRIPTION OF THE PREFERRED EMBODIMENT

Figure 1:
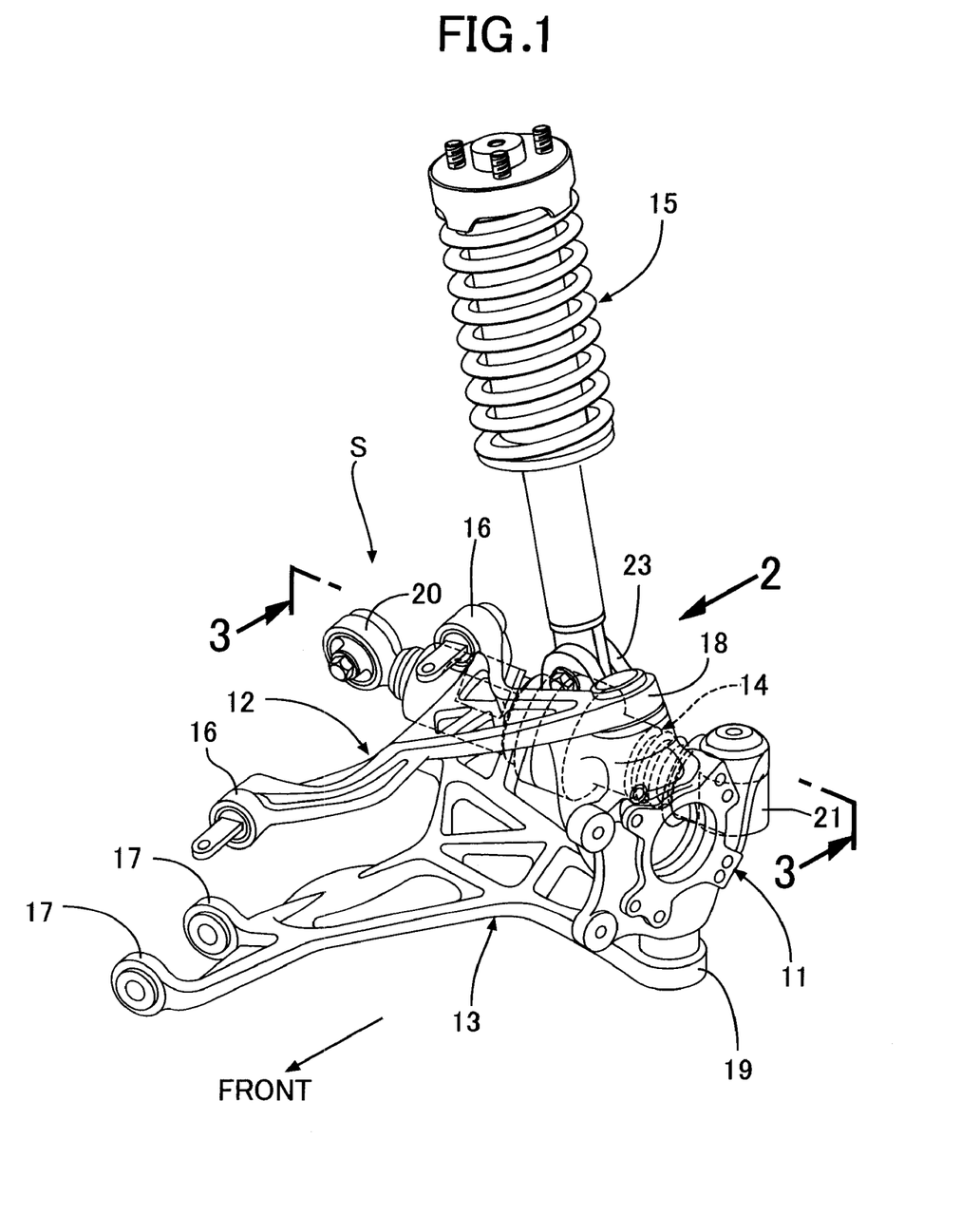
FIG. 1 is a perspective view of a suspension system for a rear left wheel.
Figure 2:
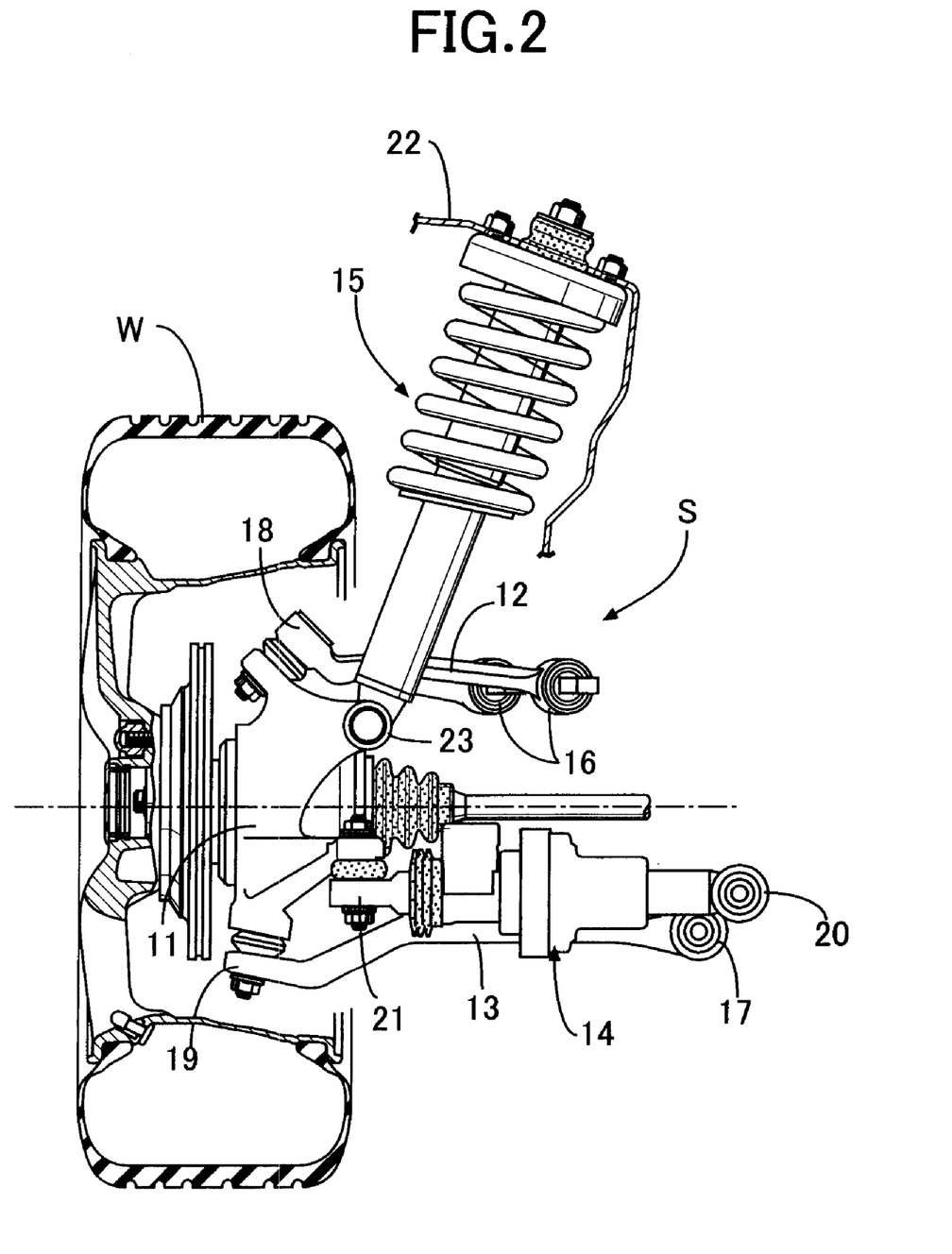
FIG. 2 is a view from arrow 2 in FIG. 1.

As shown in FIG. 1 and FIG. 2, a double wishbone type rear suspension S of a four-wheel steering vehicle is formed from a knuckle 11 rotatably supporting a rear wheel W, an upper arm 12 and a lower arm 13 vertically movably connecting the knuckle 11 to a vehicle body, a toe control actuator 14 connecting the knuckle 11 and the vehicle body in order to control the toe angle of the rear wheel W, a suspension spring-equipped damper 15 for cushioning vertical movement of the rear wheel W, etc.

Extremities of the upper arm 12 and the lower arm 13 having base ends connected to the vehicle body via rubber bush joints 16, 16; 17, 17 respectively are connected to an upper part and a lower part of the knuckle 11 via ball joints 18 and 19, respectively. The toe control actuator 14 has a base end connected to the vehicle body via a rubber bush joint 20, and an extremity connected to a rear part of the knuckle 11 via a rubber bush joint 21. The lower end of the suspension spring-equipped damper 15, which has its upper end fixed to the vehicle body (an upper wall 22 of a suspension tower), is connected to an upper part of the knuckle 11 via a rubber bush joint 23.

When the toe control actuator 14 is driven to expand, the rear part of the knuckle 11 is pushed outward in the vehicle width direction and the toe angle of the rear wheel W changes in a toe-in direction, and when the toe control actuator 14 is driven to contract, the rear part of the knuckle 11 is pulled inward in the vehicle width direction and the toe angle of the rear wheel W changes in a toe-out direction. Therefore, in addition to normal steering of a front wheel by operation of a steering wheel, by controlling the toe angle of the rear wheel W according to the vehicle speed or the steering angle of the steering wheel, it is possible to enhance the straight-line stability performance and the turning performance of the vehicle.

The structure of the toe control actuator 14 is now explained in detail by reference to FIG. 3 to FIG. 6.

Figure 3:
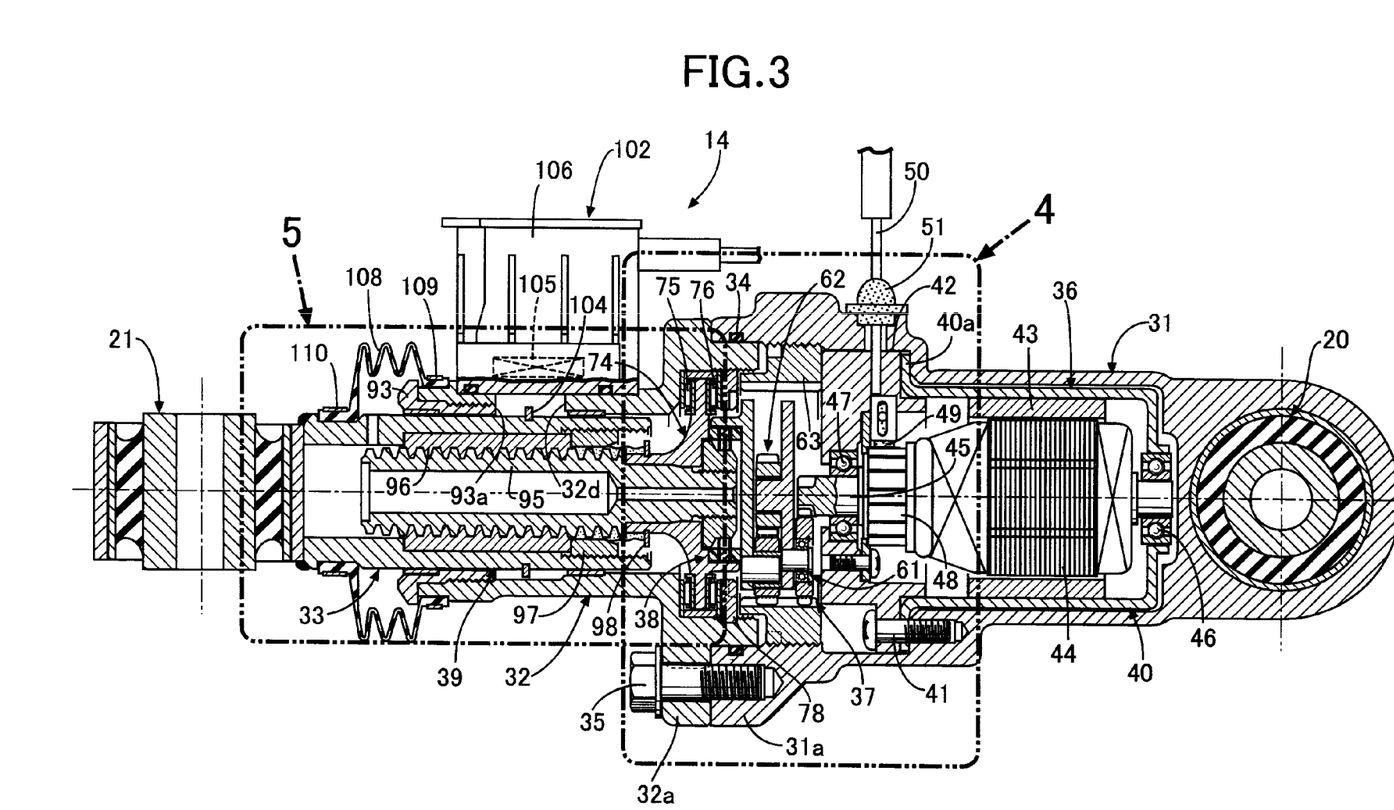
FIG. 3 is an enlarged sectional view along line 3-3 in FIG. 1.
Figure 4:
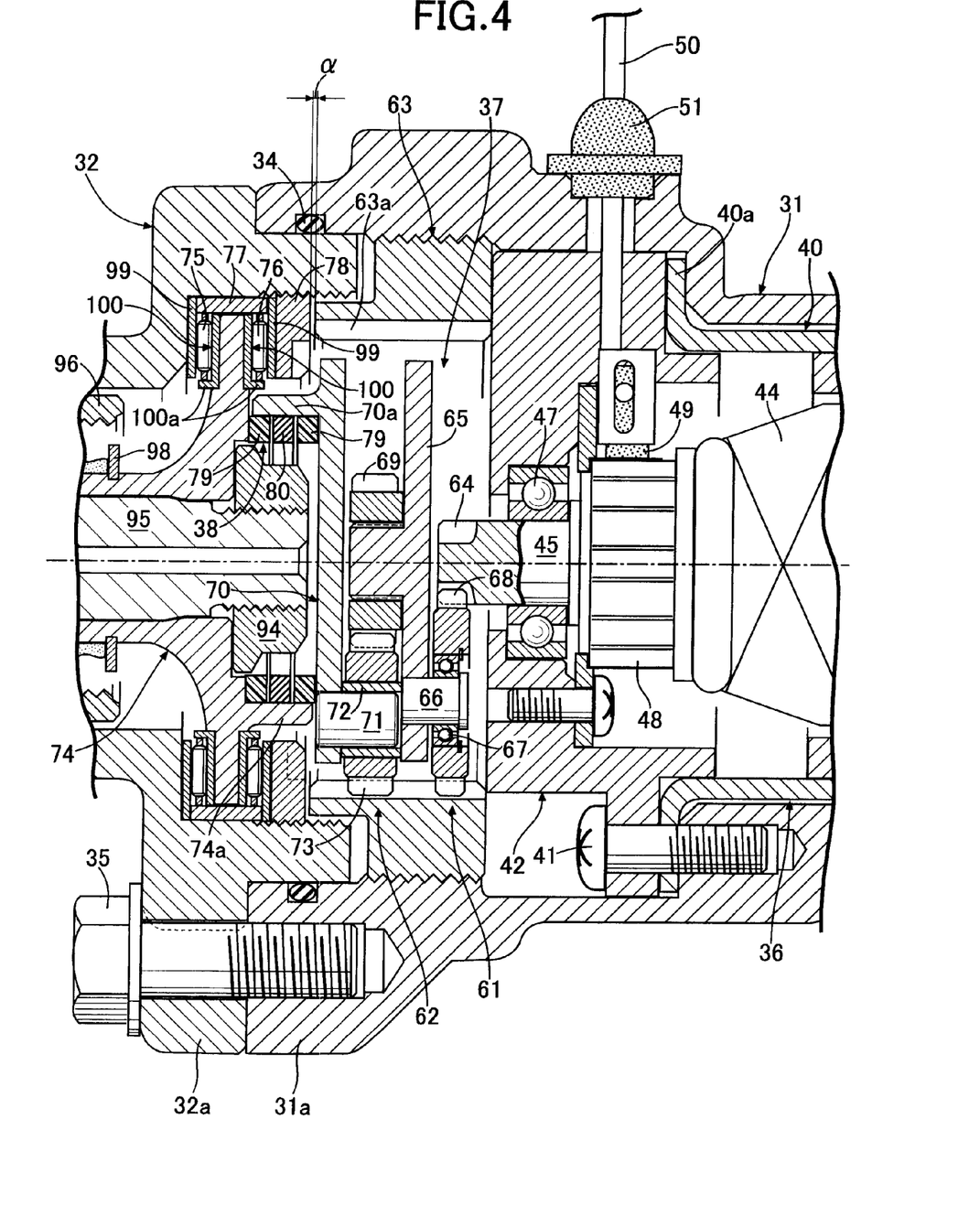
FIG. 4 is an enlarged view of part 4 in FIG. 3.

As shown in FIG. 3 and FIG. 4, the toe control actuator 14 includes a first housing 31 provided integrally with a rubber bush joint 20 connected to the vehicle body side, and a second housing 32 supporting an output rod 33 in a manner that an output rod 33 can expand and contract. The output rod 33 is provided integrally with a rubber bush joint 21 connected to the knuckle 11 side. The first and second housings 31 and 32 are faucet-fitted to each other at their facing portions with a seal member 34 disposed in between, and are integrated with each other in such a way that coupling flanges 31a and 32a of the respective first and second housings 31 and 32 are fastened to each other with a plurality of bolts 35. A motor 36 having a brush, which serves as a driving source, and a planetary reduction gear 37 are housed inside the first housing 31. An elastic coupling 38 and a screw feed mechanism 39 using a trapezoidal screw thread are housed inside the second housing 32.

An outer shell of the motor 36 is formed from a yoke 40 formed in a cup shape having a flange 40a, and a bearing holder 42 secured to the flange 40a of the yoke 40 via a plurality of bolts 41. The bolts 41, fastening the yoke 40 and the bearing holder 42 to each other, are screwed into an end face of the first housing 31, and the motor 36 is fixed to the first housing 31 by use of the bolts 41.

With regard to a rotor 44 disposed within an annular stator 43 supported on an inner peripheral face of the yoke 40, one end of a rotating shaft 45 thereof is rotatably supported on a ball bearing 46 provided in a bottom part of the yoke 40, and the other end thereof is rotatably supported on a ball bearing 47 provided in the bearing holder 42. A brush 49 is supported on the inner face of the bearing holder 42, the brush 49 being in sliding contact with a commutator 48 provided on the outer periphery of the rotating shaft 45. A conducting wire 50 extending from the brush 49 is led to the outside via a grommet 51 provided on the first housing 31.

Figure 6:
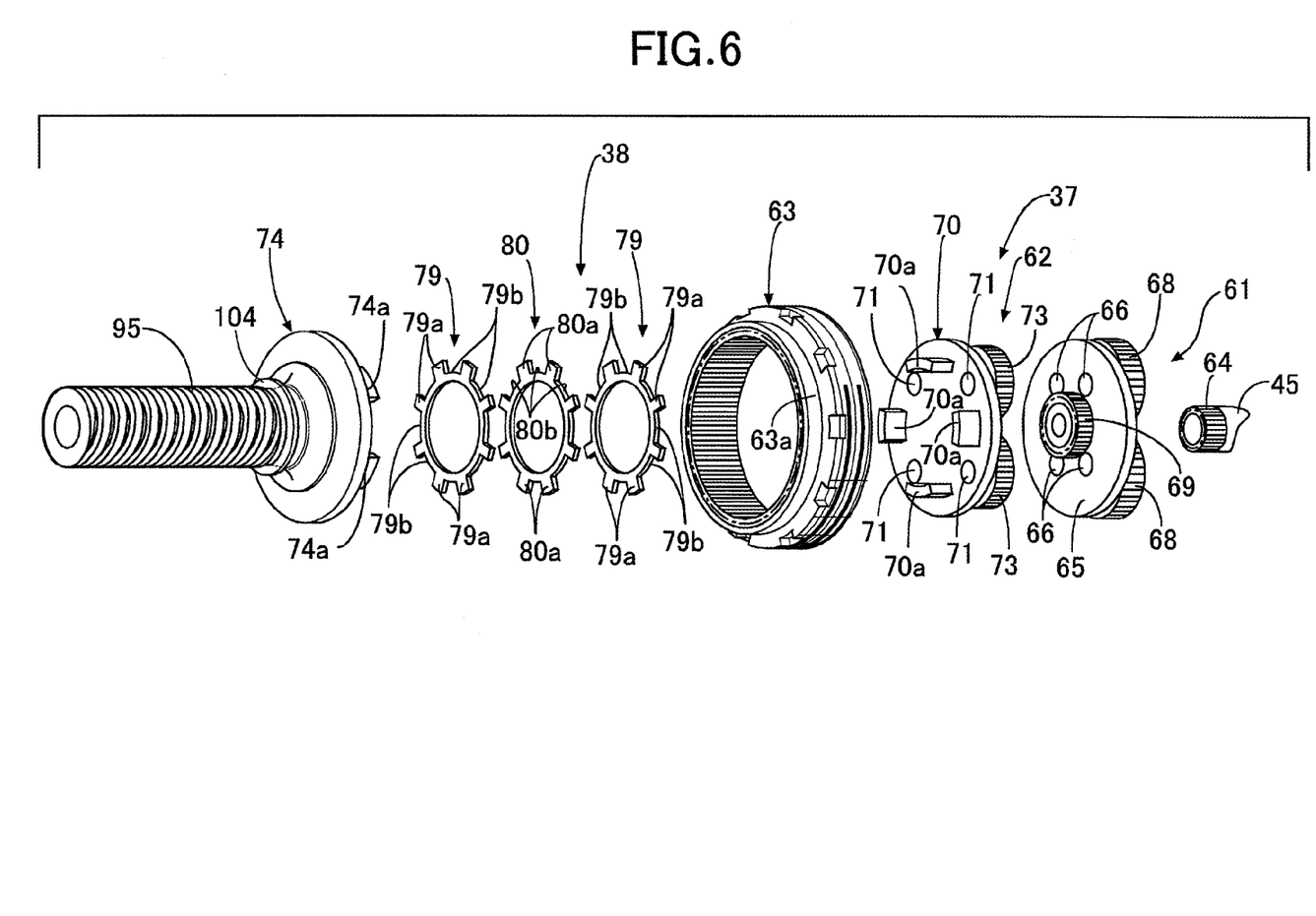
FIG. 6 is an exploded perspective view of a reduction gear and a coupling.

As is clear from FIG. 4 and FIG. 6, the reduction gear 37 is formed by coupling a first planetary gear mechanism 61 and a second planetary gear mechanism 62 in two stages. The first planetary gear mechanism 61 is formed from a ring gear 63 screwed to an opening of the first housing 31, a first sun gear 64 directly formed on a tip end of the rotating shaft 45 of the motor 36, a disk-shaped first carrier 65, and four first pinions 68 rotatably supported via ball bearings 67 on first pinion pins 66 cantilever-supported by press-fitting into the first carrier 65 and simultaneously meshing with the ring gear 63 and the first sun gear 64. The first planetary gear mechanism 61 reduces the speed of rotation of the first sun gear 64, which is an input member, and transmits it to the first carrier 65, which is an output member.

The second planetary gear mechanism 62 of the reduction gear 37 is formed from the ring gear 63, which is common to the first planetary gear mechanism 61, a second sun gear 69 fixed to the center of the first carrier 65, a disk-shaped second carrier 70, and four second pinions 73 that are rotatably supported via slide bushes 72 on second pinion pins 71 cantilever-supported by press-fitting into the second carrier 70 and that simultaneously mesh with the ring gear 63 and the second sun gear 69. The second planetary gear mechanism 62 reduces the speed of rotation of the second sun gear 69, which is an input member, and transmits it to the second carrier 70, which is an output member.

By connecting the first and second planetary gear mechanisms 61 and 62 in series in this way, it is possible to obtain a large reduction ratio and, moreover, to reduce the size of the reduction gear 37. In addition, the first sun gear 64 of the first planetary gear mechanism 61 is formed directly on the rotating shaft 45 of the motor 36 instead of being fixed onto the rotating shaft 45. Accordingly, not only is it possible to reduce the number of components as compared with the case of using the first sun gear 64 which is separate from the rotating shaft 45, but also it is possible to reduce the diameter of the first sun gear 64 to the minimum, thereby setting large the reduction ratio of the first planetary gear mechanism 61.

The second carrier 70 serving as an output member of the reduction gear 37 is connected to a thrust-receiving flange 74 serving as an input member of the screw feed mechanism 39 via the coupling 38. The thrust-receiving flange 74, which is substantially disk-shaped, is rotatably supported in such a way that an outer periphery of the thrust-receiving flange 74 is sandwiched by a pair of thrust bearings 75 and 76. Specifically, an annular locknut 78 is fastened to an inner peripheral surface of the second housing 32 with a spacer collar 77 sandwiched therebetween. The thrust bearings 75 and 76 are arranged so that the thrust bearing 75 supports a thrust load between the second housing 32 and the thrust-receiving flange 74, and so that the thrust bearing 76 supports a thrust load between the locknut 78 and the thrust-receiving flange 74.

The ring gear 63 shared by the first and second planetary gear mechanisms 61 and 62 has an outer peripheral surface screwed into an inner peripheral surface of the first housing 31. A protrusion 63a protruding from an end surface of the ring gear 63 on the screw feed mechanism 39 side faces an end surface of the locknut 78 on the motor 36 side with a slight gap α provided therebetween. Each of the components of the first and second planetary gear mechanisms 61 and 62 is made of iron, except that only the ring gear 63 is made of an aluminum alloy, which is the same as the material of the first housing 31 into which the ring gear 63 is screwed.

Accordingly, even if the locknut 78 holding the thrust bearings 75 and 76 is loosened from the second housing 32, since the protrusion 63a of the ring gear 63 faces the end surface of the locknut 78 on the motor 36 side with the slight gap α therebetween, the protrusion 63a prevents the locknut 78 from dropping off, and at the same time, the locknut 78 prevents the loosened ring gear 63 from dropping off. In addition, when the first housing 31 and the second housing 32 are to be connected, if the ring gear 63 is not completely screwed into the first housing 31 or if the locknut 78 is not completely screwed into the second housing 32, the first and second housings 31 and 32 cannot be connected because the protrusion 63a of the ring gear 63 and the locknut 78 interfere with each other. As a result, it is possible to securely avoid such a case that the ring gear 63 or the locknut 78 is failed to be fastened.

In addition, clearances are provided in advance among the components, made of iron, of the first and second planetary gear mechanisms 61 and 62 housed inside the first housing 31, made of the aluminum alloy. For this reason, mutual interference of the components with one another due to thermal expansion or contraction is not so problematic. However, only the ring gear 63 is screwed into the first housing 31 with no clearance. If the ring gear 63 were made of iron having a low coefficient of thermal expansion and the first housing 31 made of the aluminum alloy having a high coefficient of thermal expansion, they would be largely affected by the difference in coefficient of thermal expansion therebetween. For example, at a high temperature, the first housing 31 expands in the radial direction, so that the threaded connection of the first housing and the ring gear 63 would probably be likely to be loosened. On the other hand, at a low temperature, the first housing 31 contracts in the axial direction so as to reduce the gap α, so that the protrusion 63a of the ring gear 63 would probably interfere with the locknut 78.

However, in this embodiment, the ring gear 63 is made of the same aluminum alloy as that of the first housing 31, so that the above-described problem is avoided.

The coupling 38 includes two outer-side elastic bushes 79, 79 each made of polyacetal, for example, and one inner-side elastic bush 80 made of silicone rubber, for example. In addition, eight protrusions 79*a* or 80*a* and eight grooves 79*b* or 80*b* are formed radially at predetermined intervals on the outer periphery of each of the elastic bushes 79, 79, and 80. On the other hand, a set of four nails 70*a*, arranged at predetermined intervals, and a set of four nails 74*a*, arranged at predetermined intervals, protrude respectively from surfaces, facing each other, of the second carrier 70 and the thrust-receiving flange 74, so as to confront each other in the axial direction.

The outer-side elastic bushes 79, 79 and the inner-side elastic bush 80 are overlapped with one another in such a manner that the phase of the protrusions 79*a* and the phase of the protrusions 80*a* coincide with each other. The four nails 70*a* of the second carrier 70 engage respectively with alternately-located four out of the eight sets of the grooves 79*b* and the grooves 80*b*, while the four nails 74*a* of the thrust-receiving flange 74 engage respectively with the other four out of the eight sets of the grooves 79*b* and the grooves 80*b*.

Figure 5:
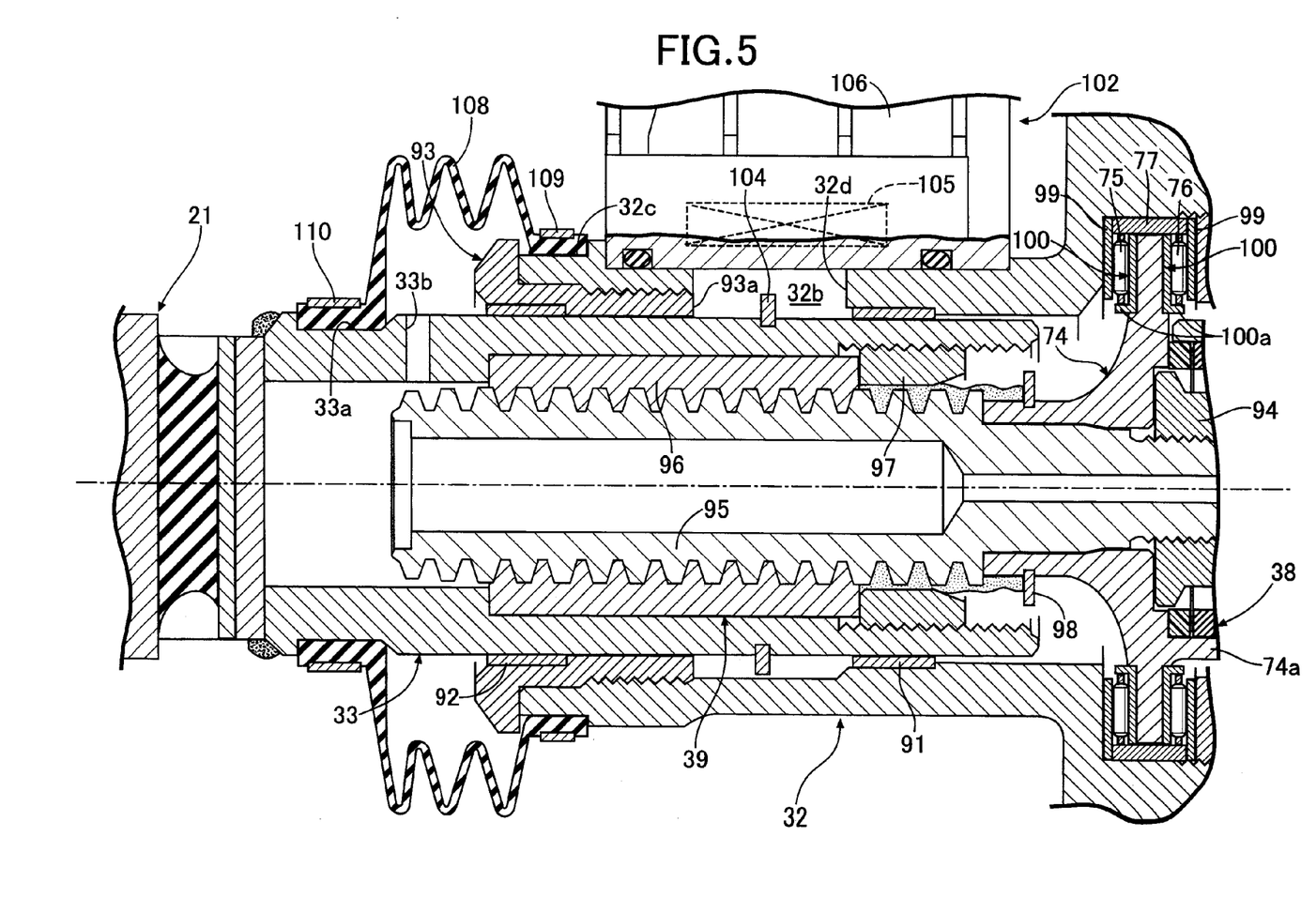
FIG. 5 is an enlarged view of part 5 in FIG. 3.

As is clear from FIG. 5, a first slide bearing 91 is fixed on an inner peripheral surface of the second housing 32 at a middle portion thereof in the axial direction. In addition, a second slide bearing 92 is fixed on an inner peripheral surface of an end member 93, which is screwed into an end portion, in the axial direction, of the first housing 32. The output rod 33 is slidably supported by the first and second slide bearings 91 and 92. The screw feed mechanism 39, which converts the rotating movement of the thrust-receiving flange 74 into a thrusting movement of the output rod 33, includes a male thread member 95 and a female thread member 96. The male thread member 95 penetrates the center of the thrust-receiving flange 74, and is fastened with a nut 94 (see FIG. 4). The female thread member 96 is screwed onto an outer periphery of the male thread member 95, and is also fitted into an inner peripheral surface of the hollow output rod 33 and fixed with a locknut 97.

As described above, the output rod 33 is supported in the second housing 32 via the plurality of (two in this embodiment) slide bearings 91 and 92. Accordingly, it is possible to securely support, with the second housing 32, the load applied in the radial direction to the output rod 33, and thus to prevent the wrenching of the screw feed mechanism 39.

A grease retainer 98 formed of, for example a circlip is mounted on the outer periphery of the thrust-receiving flange 74 in a vicinity of the portion where the thrust-receiving flange 74 is connected to the male thread member 95. Grease held in a portion where the male thread member 95 and the female thread member 96 mesh with each other is mixed with a metallic abrasion powder generated in the portion. If flowing into the thrust bearing 75 on the screw feed mechanism 39 side, the grease may possibly deteriorate the durability of the thrust bearing 75. However, according to this embodiment, the grease retainer 98 prevents the grease held in the portion where the male thread member 95 and the female thread member 96 mesh with each other from flowing into the thrust bearing 75 side, so that the durability of the thrust bearing 75 can be secured.

Moreover, the thrust bearing 75, on the screw feed mechanism 39 side, of the thrust-receiving flange 74 includes: a first washer 99 between the thrust bearing 75 and the second housing 32; and a second washer 100 between the thrust bearing 75 and the thrust-receiving flange 74. The lower end of the first washer 99 extends downward, by a distance d1, below the lower end of the second housing 32 that is in contact with the first washer 99. Moreover, the second washer 100 includes a bent portion 100*a* formed on the lower end of the second washer 100. The bent portion 100*a* is bent, by a distance d2, toward the screw feed mechanism 39 in such a manner as to cover the inner peripheral surface of the thrust bearing 75.

As described above, the inner peripheral portion of the thrust bearing 75 is covered with the first and second washers 99 and 100 sandwiching the thrust bearing 75. This structure makes it possible to further securely prevent the grease held in the portion where the male thread member 95 and the female thread member 96 mesh with each other from flowing into the thrust bearing 75 in cooperation with the grease retainer 98.

Note that, the thrust bearing 76, on the motor 36 side, of the thrust-receiving flange 74 also has the same structure as that of the thrust bearing 75 on the screw feed mechanism 39 side. However, the grease hardly flows into the thrust bearing 76 on the motor 36 side because the grease is blocked by the thrust-receiving flange 74. For this reason, first and second washers 99 and 100 of the thrust bearing 76 may be those having a normal structure.

A stroke sensor 102 is provided to the second housing 32 in order to detect the position of the output rod 33 being expanded or contracted in the expansion and contraction control of the toe control actuator 14. The stroke sensor 102 includes: a coil 105 which magnetically detects the position of a movable stopper 104 made of an annular permanent magnet and fixed on the outer peripheral surface of the output rod 33; and a sensor body 106 which houses the coil 105. In the second housing 32, an opening 32*b* is formed which extends in the axial direction so as to avoid interference of the second housing 32 with the movable stopper 104, which would otherwise occur in association with the movement of the output rod 33. At the two ends of the opening 32*b* in the axial direction, a fixed stopper 93*a* of the end member 93 and a fixed stopper 32*d* of the second housing 32 are respectively provided, so that the movable stopper 104 can come into contact with these fixed stoppers 93*a* and 32*d*.

The movable stopper 104 as well as the two fixed stoppers 93*a* and 32*d* restrict the range in which the output rod 33 can be expanded and contracted. The expansion limit of the output rod 33 is defined with the movable stopper 104 coming into contact with the fixed stopper 93*a*, while the contraction limit of the output rod 33 is defined with the movable stopper 104 coming into contact with the fixed stopper 32*d*. In addition, the movable stopper 104 is formed of the permanent magnet so as to be detectable by the coil 105 of the stroke sensor 102. Accordingly, as compared with a case where a dedicated permanent magnet is fixed to the output rod 33 with a fixing member, it is possible to reduce the number of components, costs, and space for installation because such dedicated permanent magnet and the fixing member are unnecessary.

An annular step portion 32*c* is formed in the second housing 32 while an annular groove 33*a* is formed in the output rod 33. In order to prevent water or dust from entering a gap between the second housing 32 and the output rod 33, two ends of a boot 108 are fitted respectively onto the annular step portion 32*c* and the annular groove 33*a*, and fixed thereto respectively with bands 109 and 110.

Expansion of the output rod 33 increases the volume of the internal space of the first and second housings 31 and 32, while contraction of the output rod 33 decreases the volume of the internal space of the first and second housings 31 and 32. This change in the volume causes a variation in pressure inside the internal space, which may possibly prevent the toe control actuator 14 from smoothly operating. However, since the internal space of the hollow output rod 33 and the internal space of the boot 108 communicate with each other via a vent hole 33b formed in the output rod 33, the variation in pressure is reduced by the deformation of the boot 108, so that the toe control actuator 14 can smoothly operate.

An embodiment of the present invention is explained above, but the present invention is not limited to the abovementioned embodiment and may be modified in a variety of ways as long as the modifications do not depart from the present invention described in the claims.

For example, although the protrusion 63a is provided on the ring gear 63 in this embodiment, a protrusion may alternatively be provided on the locknut 78, or may be provided on both of the ring gear 63 and the locknut 78.

What is claimed is:

1. A telescopic actuator, comprising:
    a planetary reduction gear housed in a first housing with a first housing opening;
    a screw feed mechanism housed in a second housing with a second housing opening, wherein the second housing supports a thrust force acting on a thrust-receiving flange provided to a male thread member of the screw feed mechanism and the first housing opening is connected to the second housing opening in an axial direction; and
    a ring gear of the reduction gear is screwed into an inner peripheral surface of the first housing through the first housing opening, wherein the thrust-receiving flange is held by a locknut screwed into an inner peripheral surface of the second housing through the second housing opening,
    the locknut and the ring gear face each other in the axial direction with a slight gap provided therebetween in a state where the first and second housings are connected to each other, and
    the telescopic actuator converts a rotation of a rotating shaft of a motor into expansion and contraction movements of an output rod via the planetary reduction gear and the screw feed mechanism.

2. The telescopic actuator of claim 1, wherein the locknut and the ring gear are prevented from dropping off the first and second housings without using any dedicated locking means provided.

3. The telescopic actuator of claim 1, wherein a rubber bush joint is integrally provided with the first housing.

4. The telescopic actuator of claim 1, wherein the second housing supports the output rod in such a manner so as to allow expansion and contraction of the output rod.

5. The telescopic actuator of claim 1, wherein the first and second housings are faucet-fitted to each other at their facing portions with a seal member disposed in between.

6. The telescopic actuator of claim 1, wherein an elastic coupling and the screw feed mechanism using a trapezoidal screw thread are housed inside the second housing.

* * * * *